July 17, 1962 W. T. COX 3,044,820
WHEEL UNITS
Filed May 12, 1961
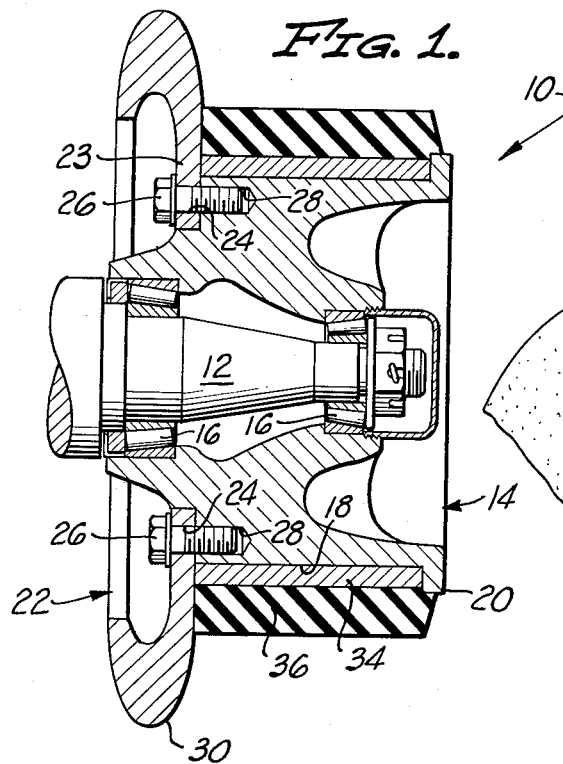
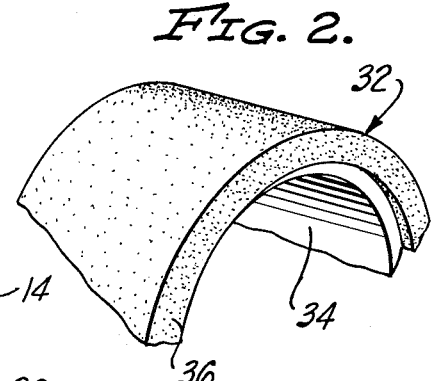
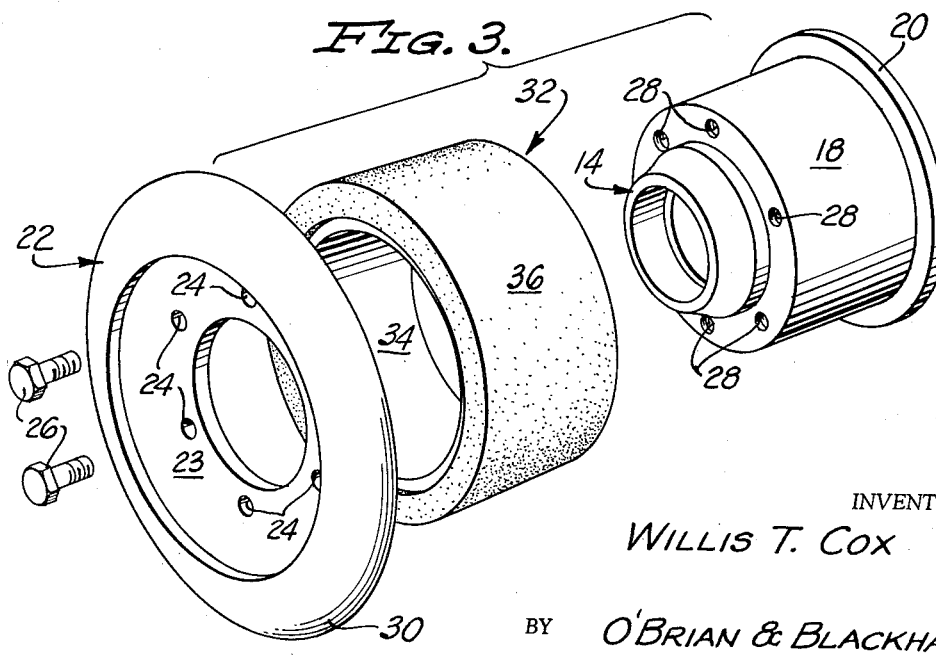
INVENTOR
WILLIS T. COX
BY O'BRIAN & BLACKHAM
ATTORNEYS United States Patent Office 3,044,820
Patented July 17, 1962

3,044,820
WHEEL UNITS
Willis T. Cox, 1021 Fruit St., Santa Ana, Calif.
Filed May 12, 1961, Ser. No. 109,687
2 Claims. (Cl. 295—7)

This invention pertains to new and improved wheel units.

The wheel units of the present invention are used in conjunction with equipment for supporting automotive type vehicles such as cars or trucks upon railroad tracks so that such automotive type vehicles may be propelled along such tracks under their own motive power. Wheel units of this invention are used in conjunction with other equipment on automotive type vehicles so that such vehicles may be used for track inspection purposes, for purposes pertaining to the repair and maintenance of a road bed, or for purposes of taking care of land areas adjacent to a railroad track or the like. Thus, for example, wheel units of the present invention can be employed in conjunction with trucks used to spray weed killer or the like upon land areas adjacent to the railroad track.

A conventional railroad type wheel is not considered desirable for such uses for several different reasons. A conventional metal railroad wheel is not considered desirable for use with an automotive type vehicle or the equivalent as set forth in the preceding because of various noise characteristics and problems. Further, when a conventional railroad wheel wears from a desired shape the entire wheel must be replaced. Such replacement is considered to amount to an undue or unnecessary economic loss. Also, the very weight of conventional railroad type wheel units cause an economic problem in shipping such units to where they are apt to be needed, and results in problems pertaining to the mounting of such units.

A broad object of the present invention is to provide new and improved wheel units or guide wheel units for use in supporting automotive type vehicles such as cars and trucks upon railroad rails. Another broad object of the present invention is to provide units of this type which effectively employ a rubber surface so as to control noise during the use of these wheel units, and which also are constructed in such a manner that upon wear only parts of these units need be replaced. Related objects of the present invention are to provide relatively inexpensive wheel type units of the class described which may be easily repaired and/or replaced, and which utilize individual parts capable of being separately shipped and capable of being easily handled during repair and/or installation.

These and various other objects and advantages of this invention will be apparent from a detailed consideration of the remainder of this specification including the appended claims forming a part of this application and from a consideration of the accompanying drawing in which:

FIG. 1 is a cross-sectional view of the complete wheel unit of this invention assembled upon an axle;

FIG. 2 is a partially perspective view of a part of this wheel unit; and

FIG. 3 is an exploded perspective view illustrating the parts of the wheel unit shown in FIG. 1.

The accompanying drawing is primarily intended so as to clearly illustrate a presently preferred embodiment of a wheel unit as herein described so that the nature of this wheel unit may be easily understood. Those skilled in the art to which this invention pertains will realize that various differently appearing wheel units using the features or structures set forth in the appended claims may be designed on the basis of this disclosure through the use of routine design and/or engineering ability.

As an aid to understanding this invention it can be stated in essentially summary form that it concerns wheel units for use in supporting automotive type vehicles upon a railroad track as outlined in the preceding discussion, each of which wheel units includes a hub having an external cylindrical surface and a flange located so as to extend from this surface at one end of it. In a wheel unit of the present invention what may be termed a "wheel" or a "wheel means" is located upon the cylindrical surface of the hub against the flange, and a flange member is attached to the hub at the extremity of the cylindrical surface remote from the flange on the hub so as to hold the wheel in place. Preferably this wheel used in a complete unit of the present invention carries an external rubber cylinder which is adapted to engage a railroad rail and which is held under compression by engagement with the flange on the hub and with the flange member.

The actual details of this invention are best more fully described by referring directly to the accompanying drawings. In FIG. 1 there is shown a complete wheel unit 10 of the present invention utilized about a known type of axle 12. This wheel unit 10 includes a centrally located hub 14 supported upon the axle 12 through the use of conventional bearings 16. This hub 14 includes a cylindrical exterior surface 18 and a flange 20. This flange 20 is located at one end of the surface 18 and extends completely around the exterior of the surface 18.

The wheel unit 10 also includes a flange member 22 having a generally disc-like shape. The center portion 23 of this flange member 22 includes a plurality of openings 24 which are adapted to be used in conjunction with bolts 26 in attaching it (the flange member 22) to the hub 14. These bolts 26 engage threaded openings 28 in the hub 14. The flange member 22 is formed so as to include a curved periphery 30 which extends from the center portion 23 and which is curved away from the surface 18 adjacent to the center portion 23 and which then curves back toward the axis of the axle 12, as indicated in FIG. 1 of the drawing. During the use of the wheel unit 10 this periphery 30 is adapted to engage a side of a railroad track (not shown) in order to hold the entire wheel unit 10 upon the track. The type of curved shape employed with the periphery 30 is considered to be desirable for this purpose, and is considered to be of such a shape as to minimize any tendency of the wheel unit 10 "to ride up" over a railroad track.

In the wheel unit 10 a wheel or wheel means 32 is utilized in conjunction with the hub 14 and the flange member 22. This wheel 32 includes a light weight metal cylinder 34 such as an aluminum cylinder which has an internal diameter corresponding to the external diameter of the surface 18 so that it may be located upon this surface 18 as indicated in FIG. 1 and so that it fits closely against the surface 18. The cylinder 34 is preferably of such a length as to fit closely against the flange 20 and the center portion 23 of the flange member 22 when the wheel 32 is installed in the wheel unit 10. Preferably the thickness of this cylinder 34 is less than the distance of the flange 20 extending from the surface 18.

The cylinder 34 is preferably attached to, and carries, an elastomeric cylinder 36 which, of course, has an internal diameter corresponding to the external diameter of the cylinder 34. This elastomeric cylinder 36 prior to its installation in the wheel unit 10 extends from both of the ends of the cylinder 34. When the wheel 32 is installed in the complete wheel unit 10, the extremities of the elastomeric cylinder 36 are engaged by both the center portion 23 of the flange member 22 and by the flange 20. Such engagement places the extremities of the elastomeric cylinder 36 under compression so as to effect what amounts to water and contaminant resistant joint between the cylinder 36 and the flange 20.

This type of "joint" effectively prevents the entrance of contaminants into the areas generally between the hub 14 and the elastomeric cylinder 36. As a consequence of this external influences are not apt to abrade and/or corrode or otherwise interfere with the "internal" structure described generally between the hub 14 and the cylinder 36. Because of this the entire wheel unit 10 may always be easily disassembled for maintenance and other purposes. Further, the type of construction explained herein is desirable because there is little, if any, danger of the elastomeric cylinder 36 slipping during the use of the wheel unit 10 by virtue of the fact that it is held under compression at its ends.

As indicated in the initial portions of this specification the wheel unit 10 may be readily installed upon equipment for supporting automotive type vehicles upon railroad tracks. When used for this purpose the elastomeric cylinder 36 serves its primary supporting function by engaging a railroad rail (not shown). Because of its inherent character this cylinder 36 tends to "soften" the ride achieved as the wheel unit 10 is used and to decrease noise resulting from the use of a vehicle upon a railroad track. During the use of the wheel unit 10 for its intended purpose the cylinder 36 will, of course, tend to abrade and wear to some limited extent. The amount of such wear will be dependent upon the nature of the elastomeric material used within the cylinder 36. In general, various known natural or synthetic elastomeric rubber compositions may be used in forming the elastomeric cylinder 36 herein described.

An advantage of the present invention is the ease with which the wheel 32 may be replaced if it is necessary to replace the elastomeric cylinder 36 because of wear and/or other reasons. To disassemble the wheel unit 10 it is only necessary to remove the bolts 26 and then to remove the flange member 22 in the wheel 32 from the hub 14. At this point another wheel can easily be replaced upon the hub 14 and the entire wheel unit 10 may be reassembled by simply locating the bolts 26 as indicated in FIG. 1. The flange member 22 can be replaced with substantially the same ease if this is desired because of wear or other problems.

Because of the fact that the wheel unit 10 may be easily assembled and disassembled so as to replace various parts such as a flange member 22 and the wheel 32 it is possible to store or stock only such parts as may have to be replaced in an appropriate warehouse or the like. As a consequence of this with the use of the wheel unit 10 inventory problems of an economic variety tend to be reduced. Also, since it is possible to avoid storing an entire wheel unit with the present invention, it is possible to save money since only the individual parts which have to be replaced are normally shipped from one location to another. Such shipping costs are also saved when the various parts of the wheel unit 10 are formed out of present-day, comparatively light weight materials.

Because of the nature of this invention it is to be considered as being limited solely by the appended claims forming a part of this disclosure.

I claim:

1. A wheel unit for use on railroad rails which comprises: hub means for securing said wheel unit for rotation about an axle, said hub means being rigid and having an external cylindrical surface and a flange located at one end of said surface so as to extend outwardly from said surface; rigid flange means for engaging the side of a railroad rail attached to said hub means so as to extend outwardly from said external cylindrical surface at the end of said surface remote from said flange; and wheel means for engaging a railroad rail located on said external cylindrical surface between said flange and said flange means, said wheel means including an elastomeric cylinder located on the exterior thereof, said cylinder being held under compression by engagement with said flange and said flange means.

2. A wheel unit for use in supporting an automotive type vehicle upon a railroad rail which comprises: hub means for securing said wheel unit to an axle, said hub means being rigid and having an external cylindrical surface with a flange formed on one end thereof so as to extend outwardly from said cylindrical surface; flange means for engaging the side of a railroad rail attached to said hub means so as to extend from said hub means beyond said external cylindrical surface at the end of said external cylindrical surface remote from said flange; and wheel means for engaging a railroad rail, said wheel means having a rigid cylinder fitting against the external surface of said hub means and extending between said flange and said flange means, said wheel means also including an elastomeric cylinder secured to the exterior of said rigid cylinder along the entire length of said cylinder, said elastomeric cylinder in an uncompressed state extending beyond the ends of said rigid cylinder and being engaged by said flange and said flange means so that the extremities thereof are held under compression by said flange and said flange means and so that said elastomeric cylinder when so held is of the same length as said rigid cylinder.

References Cited in the file of this patent

UNITED STATES PATENTS

| | | |
|---|---|---|
| 657,123 | Libbey | Sept. 4, 1900 |
| 2,028,707 | Smith | Jan. 21, 1936 |